United States Patent
Tsunogae et al.

(10) Patent No.: US 11,718,709 B2
(45) Date of Patent: Aug. 8, 2023

(54) RING-OPENING COPOLYMER COMPOSITION

(71) Applicant: ZEON CORPORATION, Tokyo (JP)

(72) Inventors: Yasuo Tsunogae, Tokyo (JP); Shingo Okuno, Tokyo (JP)

(73) Assignee: ZEON CORPORATION, Tokyo (JP)

(*) Notice: Subject to any disclaimer, the term of this patent is extended or adjusted under 35 U.S.C. 154(b) by 431 days.

(21) Appl. No.: 17/260,116

(22) PCT Filed: Jul. 4, 2019

(86) PCT No.: PCT/JP2019/026680
§ 371 (c)(1),
(2) Date: Jan. 13, 2021

(87) PCT Pub. No.: WO2020/013076
PCT Pub. Date: Jan. 16, 2020

(65) Prior Publication Data
US 2021/0269585 A1  Sep. 2, 2021

(30) Foreign Application Priority Data

Jul. 13, 2018  (JP) .................... 2018-133314

(51) Int. Cl.
C08G 61/08  (2006.01)
C08K 5/01  (2006.01)

(52) U.S. Cl.
CPC ............... *C08G 61/08* (2013.01); *C08K 5/01* (2013.01)

(58) Field of Classification Search
USPC .......................... 526/281, 283, 308
See application file for complete search history.

(56) References Cited

U.S. PATENT DOCUMENTS

| | | | |
|---|---|---|---|
| 3,778,420 A * | 12/1973 | Brown et al. .......... | C08G 61/08 526/281 |
| 3,941,757 A | 3/1976 | Wakabayashi et al. | |
| 2003/0120011 A1 | 6/2003 | Starzewski et al. | |
| 2015/0376322 A1 | 12/2015 | Nakamura et al. | |
| 2018/0244837 A1 | 8/2018 | Nitadori et al. | |

FOREIGN PATENT DOCUMENTS

| | | |
|---|---|---|
| EP | 2963074 A1 | 1/2016 |
| JP | H06-248116 A | 9/1994 |
| WO | 01/072760 A1 | 10/2001 |
| WO | 2014/129547 A1 | 8/2014 |
| WO | 2017/051819 A1 | 3/2017 |

OTHER PUBLICATIONS

Sep. 17, 2019 International Search Report issued in International Patent Application No. PCT/JP2019/026680.
May 6, 2022 Extended European Search Report issued in Patent Application No. 19834868.2.
Yao, Zhen et al., "Ring-Opening Metathesis Copolymerization of Dicyclopentadiene and Cyclopentene Through Reaction Injection Molding Process.", Journal of Applied Polymer Science, (2012), vol. 125, No. 4, pp. 2489-2493.

* cited by examiner

Primary Examiner — Fred M Teskin
(74) Attorney, Agent, or Firm — Oliff PLC

(57) ABSTRACT

A ring-opened copolymer composition has a ring-opened copolymer containing structural unit derived from a norbornene compound represented by general formula (1) below and structural unit derived from a monocyclic olefin, wherein a content of a norbornene compound represented by general formula (1) is 1 ppm by weight or more and 1000 ppm by weight or less based on the ring-opened copolymer,

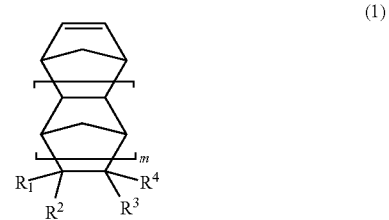

(1)

wherein $R^1$ to $R^4$ are each a hydrogen atom, a hydrocarbon group having 1 to 20 carbon atoms, or a substituent containing a halogen atom, a silicon atom, an oxygen atom or a nitrogen atom, and $R^2$ and $R^3$ may be bonded to each other to form a ring, and "m" is 0 or 1.

12 Claims, No Drawings

RING-OPENING COPOLYMER COMPOSITION

TECHNICAL FIELD

The present invention relates to a ring-opened copolymer composition containing a ring-opened copolymer, and more particularly, relates to a ring-opened copolymer composition which is excellent in heat aging resistance, has good processability, and gives a cross-linked rubber excellent in tensile strength and elongation characteristics. The present invention also relates to a rubber composition obtained using such a ring-opened copolymer composition and a rubber cross-linked product obtained using the rubber composition.

BACKGROUND ART

It is generally known that ring-opening metathesis polymerization of cyclopentene and a norbornene compound in the presence of a so-called Ziegler-Natta catalyst consisting of a compound with a transition metal of Group 6 of the periodic table, such as $WCl_6$ or $MoCl_5$, and an organic metal activator, such as triisobutylaluminium, diethylaluminium chloride, or tetrabutyltin, or ruthenium-containing catalysts such as ruthenium carbene complexes, affords an unsaturated linear ring-opened polymer.

For example, Patent Document 1 discloses a ring-opened copolymer which is prepared from cyclopentene and a norbornene compound, contains 40 to 90% by weight of cyclopentene-derived structural units and 10 to 60% by weight of norbornene compound-derived structural units with respect to the total repeating structural units in the copolymer, and has a weight average molecular weight (Mw) of 200,000 to 1,000,000.

According to the technique of Patent Document 1, a product of ring-opening polymerization of cyclopentene with a norbornene compound can provide a cross-linked rubber having improved wet grip performance and low heat built-up. However, Patent Document 1 includes no discussion on how to achieve processability as a rubber composition, tensile strength, elongation characteristics, and heat aging resistance balanced at a high level.

RELATED ART

Patent Documents

Patent Document 1: International Publication No. WO 2014/129547

SUMMARY OF THE INVENTION

Problem to be Solved by the Invention

In view of the above issue, the present invention is aimed at providing a ring-opened copolymer composition having excellent heat aging resistance and good processability and which can provide a cross-linked rubber excellent in tensile strength and elongation characteristics, a rubber composition obtained by using such a ring-opened copolymer composition, and a cross-linked rubber obtained by using the rubber composition.

Means for Solving the Problem

As a result of extensive studies to achieve the above object, the present inventors have found that, in a ring-opened copolymer composition containing a structural unit derived from a norbornene compound having a specific structure and a ring-opened copolymer containing a structural unit derived from a monocyclic olefin, a content ratio of a norbornene compound having the above specific structure is set within a predetermined range, whereby the ring-opened copolymer composition becomes excellent in heat aging resistance and good in processability, and moreover, a rubber cross-linked product obtained using the same becomes excellent in tensile strength, elongation characteristics, and heat aging resistance, and has completed the present invention.

That is, the present invention provides a ring-opened copolymer composition comprising a ring-opened copolymer containing structural unit derived from a norbornene compound represented by general formula (1) below and structural unit derived from a monocyclic olefin, wherein a content of a norbornene compound represented by general formula (1) is 1 ppm by weight or more and 1000 ppm by weight or less based on the ring-opened copolymer.

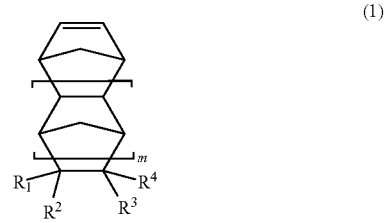

(1)

wherein $R^1$ to $R^4$ are each a hydrogen atom, a hydrocarbon group having 1 to 20 carbon atoms, or a substituent containing a halogen atom, a silicon atom, an oxygen atom or a nitrogen atom, and $R^2$ and $R^3$ may be bonded to each other to form a ring, and "m" is 0 or 1.

In the ring-opened copolymer composition according to the present invention, the cis/trans ratio of the ring-opened copolymer is preferably from 0/100 to 80/20.

In the ring-opened copolymer composition according to the present invention, the glass transition temperature of the ring-opened copolymer is preferably −80 to 10° C.

In the ring-opened copolymer composition according to the present invention, a content ratio of the structural unit derived from the norbornene compound represented by the general formula (1) to the total repeating structural units in the ring-opened copolymer is preferably 20 to 80% by weight.

In the ring-opened copolymer composition according to the present invention, a content ratio of the structural unit derived from monocyclic olefin to the total repeating structural units in the ring-opened copolymer is preferably 20 to 80% by weight.

In the ring-opened copolymer composition according to the present invention, the norbornene compound represented by general formula (1) is preferably bicyclo[2.2.1]hept-2-enes having no substituents or having a hydrocarbon substituent or tetracyclo[6.2.1.1$^{3,6}$.0$^{2,7}$]dodec-4-enes having no substituents or having a hydrocarbon substituent.

In the ring-opened copolymer composition according to the present invention, the monocyclic olefin is preferably a cyclic monoolefin.

In the ring-opened copolymer composition according to the present invention, the cyclic monoolefin is preferably at least one selected from cyclopentene, cyclohexene, cycloheptene and cyclooctene.

In the ring-opened copolymer composition according to the present invention, the ring-opened copolymer is preferably substantially consisting of the structural unit derived from the norbornene compound represented by the general formula (1) and the structural unit derived from the monocyclic olefin.

The present invention also provides rubber composition comprising the above ring-opened copolymer composition.

The rubber composition according to the present invention preferably further comprises a cross-linking agent.

The present invention further provides a cross-linked rubber obtained by cross-linking the above rubber composition.

Effects of Invention

The present invention can provide a ring-opened copolymer composition having excellent heat aging resistance and good processability and which can provide a cross-linked rubber excellent in tensile strength, elongation characteristics, and heat aging resistance. The present invention can also provide a rubber composition obtained by using such a ring-opened copolymer composition and a cross-linked rubber obtained by using the rubber composition and having excellent tensile strength, elongation characteristics, and heat aging resistance.

DESCRIPTION OF EMBODIMENTS

The ring-opened copolymer composition according to the present invention comprises a ring-opened copolymer containing structural unit derived from a norbornene compound represented by general formula (1) which is below explained and structural unit derived from a monocyclic olefin, wherein a content of a norbornene compound represented by general formula (1) is 1 ppm by weight or more and 1000 ppm by weight or less based on the ring-opened copolymer.

<Ring-Opened Copolymer>

The ring-opened copolymer used in the present invention contains structural units derived from a norbornene compound represented by general formula (1) below and structural units derived from a monocyclic olefin.

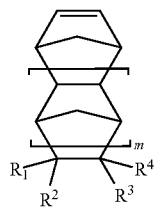

(1)

(In the formula, $R^1$ to $R^4$ are each a hydrogen atom, a hydrocarbon group having 1 to 20 carbon atoms, or a substituent containing a halogen atom, a silicon atom, an oxygen atom or a nitrogen atom, and $R^2$ and $R^3$ may be bonded to each other to form a ring, and "m" is 0 or 1.)

Specific examples of the norbornene compound represented by general formula (1) include the following compounds:

bicyclo[2.2.1]hept-2-enes having no substituents or having a hydrocarbon substituent, such as 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-cyclohexenyl-2-norbornene, 5-cyclopentenyl-2-norbornene, 5-phenyl-2-nor bornene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), tetracyclo [10.2.1.0$^{2,11}$.0$^{4,9}$]pentadeca-4,6,8,13-tetraene (also referred to as 1,4-methano-1,4,4a,9,9a,10-hexahydroanthracene), dicyclopentadiene, methyl dicyclopentadiene, dihydrodicyclopentadiene (tricyclo[5.2.1.0$^{2,6}$]dec-8-en e);

tetracyclo[6.2.1.1$^{3,6}$.0$^{2,7}$]dodec-4-enes having no substituents or having a hydrocarbon substituent, such as tetracyclo[6.2.1.1$^{3,6}$.0$^{2,7}$]dodec-4-ene, 9-methyl tetracyclo[6.2.1.1$^{3,6}$.0$^{2,7}$]dodec-4-ene, 9-ethyltetracyclo[6.2.1.1$^{3,6}$.0$^{2,7}$]dodec-4-ene, 9-cyclohexyltetracyclo[6.2.1.1$^{3,6}$.0$^{2,7}$]dodec-4-ene, 9-cyclopentyltetracyclo[6.2.1.1$^{3,6}$.0$^{2,7}$]dodec-4-ene, 9-methylenetetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-vinyltetracyclo[6.2.1.1$^{3,6}$.0$^{2,7}$]dodec-4-ene, 9-propenyltetracyclo[6.2.1.1$^{3,6}$.0$^{2,7}$]dodec-4-ene, 9-cyclohexenyltetracyclo[6.2.1.1$^{3,6}$.0$^{2,7}$]dodec-4-ene, 9-cyclopentenyltetracyclo[6.2.1.1$^{3,6}$.0$^{2,7}$]dodec-4-ene, and 9-phenyltetracyclo[6.2.1.1$^{3,6}$.0$^{2,7}$]dodec-4-ene;

bicyclo[2.2.1]hept-2-enes having an alkoxycarbonyl group, such as methyl 5-norbornene-2-carboxylate, ethyl 5-norbornene-2-carboxylate, methyl 2-methyl-5-norbornene-2-carboxylate, and ethyl 2-methyl-5-norbornene-2-carboxylate;

tetracyclo[6.2.1.1$^{3,6}$.0$^{2,7}$]dodec-4-enes having an alkoxycarbonyl group, such as methyl tetracyclo[6.2.1.1$^{3,6}$.0$^{2,7}$]dodec-9-ene-4-carboxylate, and methyl 4-methyltetracyclo[6.2.1.1$^{3,6}$.0$^{2,7}$]dodec-9-ene-4-carboxylate;

bicyclo[2.2.1]hept-2-enes having a hydroxycarbonyl group or acid anhydride group, such as 5-norbornene-2-carboxylic acid, 5-norbornene-2,3-dicarboxylic acid, and 5-norbornene-2,3-dicarboxylic acid anhydride;

tetracyclo[6.2.1.1$^{3,6}$.0$^{2,7}$]dodec-4-enes having a hydroxycarbonyl group or acid anhydride group, such as tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-dicarboxylic acid, and tetracyclo[6.2.1.1$^{3,6}$.0$^{2,7}$]dodec-9-ene-4,5-dicarboxylic acid anhydride;

bicyclo[2.2.1]hept-2-enes having a hydroxyl group, such as 5-hydroxy-2-norbornene, 5-hydroxymethyl-2-norbornene, 5,6-di(hydroxymethyl)-2-norbornene, 5,5-di(hydroxymethyl)-2-norbornene, 5-(2-hydroxyethoxycarbonyl)-2-norbornene, and 5-methyl-5-(2-hydroxyethoxycarbonyl)-2-norbornene;

tetracyclo[6.2.1.1$^{3,6}$.0$^{2,7}$]dodec-4-enes having a hydroxyl group, such as tetracyclo[6.2.1.1$^{3,6}$.0$^{2,7}$]dodec-9-ene-4-methanol, and tetracyclo[6.2.1.1$^{3,6}$.0$^{2,7}$]dodec-9-ene-4-ol;

bicyclo[2.2.1]hept-2-enes having a hydrocarbonyl group, such as 5-norbornene-2-carbaldehyde;

tetracyclo[6.2.1.1$^{3,6}$.0$^{2,7}$]dodec-4-enes having a hydrocarbonyl group, such as tetracyclo[6.2.1.1$^{3,6}$.0$^{2,7}$]dodec-9-ene-4-carbaldehyde;

bicyclo[2.2.1]hept-2-enes having an alkoxycarbonyl group and a hydroxycarbonyl group, such as 3-methoxycarbonyl-5-norbornene-2-carboxylic acid;

bicyclo[2.2.1]hept-2-enes having a carbonyloxy group, such as 5-norbornene-2-yl acetate, 2-methyl-5-norbornene-2-yl acetate, 5-norbornene-2-yl acrylate, and 5-norbornene-2-yl methacrylate;

tetracyclo[6.2.1.1$^{3,6}$.0$^{2,7}$]dodec-4-enes having a carbonyloxy group, such as 9-tetracyclo[6.2.1.1$^{3,6}$.0$^{2,7}$]dodec-4-enyl acetate, 9-tetracyclo[6.2.1.1$^{3,6}$.0$^{2,7}$]dodec-4-enyl acetate, and 9-tetracyclo[6.2.1.1$^{3,6}$.0$^{2,7}$]dodec-4-enyl methacrylate;

bicyclo[2.2.1]hept-2-enes having a nitrogen-containing functional group, such as 5-norbornene-2-carbonitrile, 5-norbornene-2-carboxyamide and 5-norbornene-2,3-dicarboxic acid imide;

tetracyclo[6.2.1.1$^{3,6}$.0$^{2,7}$]dodec-4-enes having a nitrogen-containing functional group, such as tetracyclo[6.2.1.1$^{3,6}$.0$^{2,7}$]dodec-9-ene-4-carbonitrile, tetracyclo[6.2.1.1$^{3,6}$.0$^{2,7}$]dodec-9-ene-4-carboxyamide, and tetracyclo[6.2.1.1$^{3,6}$.0$^{2,7}$]dodec-9-ene-4-dicarboxic acid imide;

bicyclo[2.2.1]hept-2-enes having a halogen atom, such as 5-chloro-2-norbornene;

tetracyclo[6.2.1.1$^{3,6}$.0$^{2,7}$]dodec-4-enes having a halogen atom, such as 9-chlorotetracyclo[6.2.1.1$^{3,6}$.0$^{2,7}$]dodec-4-ene;

bicyclo[2.2.1]hept-2-enes having a silicon atom-containing functional group, such as 5-trimethoxysilyl-2-norbornene and 5-triethoxysilyl-2-norbornene;

tetracyclo[6.2.1.1$^{3,6}$.0$^{2,7}$]dodec-4-enes having a silicon atom-containing functional group, such as 4-trimethoxysilyltetracyclo[6.2.1.1$^{3,6}$.0$^{2,7}$]dodec-9-ene, and 4-triethoxysilyltetracyclo[6.2.1.1$^{3,6}$.0$^{2,7}$]dodec-9-ene.

As the above norbornene compounds represented by general formula (1), compounds where "m" in general formula (1) is 0 or 1 are preferred. In general formula (1), $R^1$ to $R^4$ may be the same or different.

Further, among the norbornene compounds represented by the above general formula (1), from the viewpoint of being more excellent in tensile strength, elongation characteristics, and heat aging resistance, $R^1$ to $R^4$ in the above general formula (1) are preferably a hydrogen atom, a chain hydrocarbon group having 1 to 20 carbon atoms, or a substituent containing a halogen atom, a silicon atom, an oxygen atom or a nitrogen atom. In this case, $R^1$ to $R^4$ may be any group which is not bonded to each other and does not form a ring, and are not particularly limited, and may be the same or different, and as $R^1$ to $R^4$, a hydrogen atom or an alkyl group having 1 to 3 carbon atoms is preferred. Also in this case, compounds represented by the general formula in which "m" is 0 or 1 are preferred.

As a norbornene compound in which $R^1$ to $R^4$ in the above general formula (1) are a hydrogen atom, a chain hydrocarbon group having 1 to 20 carbon atoms, or a substituent containing a halogen atom, a silicon atom, an oxygen atom or a nitrogen atom, bicyclo[2.2.1]hept-2-enes having no substituents or having a hydrocarbon substituent and tetracyclo[6.2.1.1$^{3,6}$.0$^{2,7}$]dodec-4-enes having no substituents or having a hydrocarbon substituent, and among them, 2-norbornene, 5-methyl-2-norbornene, 5-ethyl-2-norbornene, 5-ethylidene-2-norbornene and tetracyclo[6.2.1.1$^{3,6}$.0$^{2,7}$]dodec-4-ene are more preferred, and, from the viewpoint of more easily obtaining the effects according to the present invention, 2-norbornene, 5-methyl-2-norbornene and tetracyclo[6.2.1.1$^{3,6}$.0$^{2,7}$]dodec-4-ene are furthermore preferred, 2-norbornene and tetracyclo[6.2.1.1$^{3,6}$.0$^{2,7}$]dodec-4-ene are particularly preferred.

Further, as the norbornene compound represented by the above general formula (1), in the case of using a compound in which $R^2$ and $R^3$ are bonded to each other to form a ring, specific examples of the ring structure, cyclopentane ring, cyclopentene ring, cyclohexane ring, cyclohexene ring, benzene ring and the like are preferably mentioned, these may form a polycyclic structure, further, these may have a substituent. Among these, a cyclopentane ring, a cyclopentene ring, and a benzene ring are preferred, and in particular, a compound having a cyclopentene ring alone or a compound having a polycyclic structure of a cyclopentane ring and a benzene ring is preferred. Note that $R^1$ and $R^4$ other than $R^2$ and $R^3$ forming a ring structure may be the same or different, and $R^1$ and $R^4$ are preferably each a hydrogen atom or an alkyl group having 1 to 3 carbon atoms. In addition, in this case, compounds represented by the general formula in which "m" is 0 are preferred.

As a compound in which $R^2$ and $R^3$ are bonded to each other to form a ring, bicyclo[2.2.1]hept-2-enes having no substituents or having a hydrocarbon substituent is preferred, and among them, dicyclopentadiene, methyldicyclopentadiene, dihydrodicyclopentadiene, 1,4-methano-1,4,4a,9a-tetrahydro-9H-fluorene, and 1,4-methano-1,4,4a, 9,9a,10-hexahydroanthracene are preferred, and dicyclopentadiene, 1,4-methano-1,4,4a, 9a-tetrahydro-9H-fluorene are more preferred.

In the present invention, as the norbornene compound, one kind may be used alone or two or more kinds may be used in combination.

In the ring-opened copolymer, the content ratio of the structural unit derived from the norbornene compound represented by the above general formula (1) to the total repeating structural units is preferably 20 to 80% by weight, more preferably 30 to 75% by weight, still more preferably 35 to 75% by weight, and particularly preferably 61 to 75% by weight. When the content ratio of the structural unit derived from the norbornene compound represented by the above general formula (1) is within the above range, it is possible to further enhance the tensile strength, elongation characteristics, and heat aging resistance of the obtained cross-linked rubber.

The monocyclic olefin may be any olefin having only one ring structure. Examples thereof include, but are not limited to, cyclic monoolefins such as cyclopropene, cyclobutene, cyclopentene, methylcyclopentene, cyclohexene, methylcyclohexene, cycloheptene, and cyclooctene; cyclic diolefins such as cyclohexadiene, methylcyclohexadiene, cyclooctadiene, and methylcyclooctadiene; and the like.

These monocyclic olefins may be used alone or in combination. As the monocyclic olefin, cyclopentene, cyclohexene, cycloheptene, and cyclooctene are preferred. From the viewpoint of more reliably obtaining the advantages according to the present invention, cyclopentene and cyclooctene are more preferred, cyclopentene is particularly preferred.

In the ring-opened copolymer, the proportion of the structural unit derived from the monocyclic olefin with respect to the total repeating structural units is preferably 20 to 80% by weight, more preferably 25 to 70% by weight, still more preferably 25 to 65% by weight, particularly preferably 25 to 39% by weight. When the proportion of the structural unit derived from the monocyclic olefin is within the above range, the tensile strength, elongation characteristics, and heat aging resistance of the obtained cross-linked rubber can be further enhanced.

The ring-opened copolymer used in the present invention may be a copolymer obtained by copolymerization of the norbornene compound represented by general formula (1) and the monocyclic olefin with additional monomers copolymerizable with these compounds. Examples of such additional monomers include polycyclic cycloolefins having an aromatic ring, and the like. Examples of the polycyclic cycloolefins having an aromatic ring include phenylcyclooctene, 5-phenyl-1,5-cyclooctadiene, phenylcyclopentene, and the like. In the ring-opened copolymer, the proportion of structural units derived from the additional monomers to the total repeating structural units is preferably 40% by weight or less, more preferably 30% by weight or less. As the ring-opened copolymer used in the present invention, it is particularly preferable that the copolymer be substantially free from structural units derived from the additional monomers. That is, the ring-opened copolymer is substantially consisting of the structural unit derived from the norbornene compound represented by the general formula (1) and the structural unit derived from the monocyclic olefin.

The weight average molecular weight (Mw) of the ring-opened copolymer used in the present invention is preferably 100,000 to 1,000,000, more preferably 100,000 to 800,000, still more preferably 150,000 to 700,000, particularly preferably 200,000 to 600,000 as measured against polystyrene standards by gel permeation chromatography. By setting the weight average molecular weight (Mw) in the above range, it is possible to further improve the tensile strength, elongation characteristics, and heat aging resistance of the obtained cross-linked rubber while maintaining good productivity and handling. The ratio (Mw/Mn) between the weight average molecular weight (Mw) and the number average molecular weight (Mn) of the ring-opened copolymer used in the present invention measured against polystyrene standards by gel permeation chromatography is preferably 1.0 to 5.0, more preferably 1.5 to 3.0.

The ring-opened copolymer according to the present invention has a cis/trans ratio of preferably 0/100 to 80/20, more preferably 5/95 to 60/40, still more preferably 10/90 to 50/50, particularly preferably 15/85 to 39/61. The cis/trans ratio refers to the ratio of the cis double bond content to the trans double bond content (cis content/trans content) in the repeating units constituting the ring-opened copolymer used in the present invention. When the cis/trans ratio is controlled within the above ranges, the tensile strength, elongation characteristics, and heat aging resistance of the obtained cross-linked rubber can be further enhanced.

The ring-opened copolymer used in the present invention has a glass transition temperature (Tg) of preferably −80 to 10° C., more preferably −75 to 5° C., still more preferably −70 to 0° C. When the glass transition temperature (Tg) is controlled within the above ranges, the tensile strength, elongation characteristics, and heat aging resistance of the obtained cross-linked rubber can be further enhanced. The glass transition temperature of the ring-opened copolymer can be controlled by selecting the type and the amount of the norbornene compound used, for example.

The ring-opened copolymer used in the present invention may have modifying groups at polymer chain ends. The presence of such modifying groups may further enhance the compatibility with filler such as silica. In this case, when the copolymer is combined with filler such as silica, the dispersibility of filler such as silica in the rubber composition may be enhanced and such enhanced dispersibility may further improve processability and may enable production of a cross-linked rubber having further enhanced tensile strength and elongation characteristics. Although not particularly limited, the modifying groups introduced to polymer chain ends are preferably modifying groups containing an atom selected from the group consisting of atoms of the Group 15 elements in the periodic table, atoms of the Group 16 elements in the periodic table, and a silicon atom.

Preferred modifying groups for forming the terminal modifying groups are modifying groups containing an atom selected from the group consisting of a nitrogen atom, an oxygen atom, a phosphorus atom, a sulfur atom, and a silicon atom because such groups can enhance the compatibility with filler such as silica and such enhanced compatibility enables production of a cross-linked rubber having much better tensile strength and elongation characteristics. Among these, modifying groups containing an atom selected from the group consisting of a nitrogen atom, an oxygen atom, and a silicon atom are more preferred.

Examples of modifying groups containing a nitrogen atom include amino, pyridyl, imino, amido, nitro, and urethane bond groups, and hydrocarbon groups containing these groups. Examples of modifying groups containing an oxygen atom include hydroxyl, carboxylic acid, ether, ester, carbonyl, aldehyde, and epoxy groups, and hydrocarbon groups containing these groups. Examples of modifying groups containing a silicon atom include alkylsilyl and oxysilyl groups, and hydrocarbon groups containing these groups. Examples of modifying groups containing a phosphorus atom include phosphoric acid and phosphino groups, and hydrocarbon groups containing these groups. Examples of modifying groups containing a sulfur atom include sulfonyl, thiol, and thioether groups, and hydrocarbon groups containing these groups. Alternatively, modifying groups containing two or more of the above groups may be used. Among these, amino, pyridyl, imino, amido, hydroxyl, carboxylic acid, aldehyde, epoxy, and oxysilyl groups, and hydrocarbon groups containing these groups can be specifically mentioned as particularly preferred examples of the modifying groups from the viewpoint of further improving processability and producing a cross-linked rubber having further enhanced tensile strength and elongation characteristics. From the viewpoint of the compatibility with filler such as silica, oxysilyl groups are particularly preferred. The "oxysilyl group" refers to a group containing a silicon-oxygen bond.

Specific examples of the oxysilyl groups include alkoxysilyl, aryloxysilyl, acyloxy, alkylsiloxysilyl, and arylsiloxysilyl groups, and the like. Other examples thereof include hydroxylsilyl groups resulting from hydrolysis of alkoxysilyl, aryloxysilyl, and acyloxy groups. Among these, aryloxysilyl groups are preferable from the viewpoint of the compatibility with silica.

The "alkoxysilyl group" refers to a group containing at least one alkoxy group linked to a silicon atom. Specific examples thereof include trimethoxysilyl, (dimethoxy)(methyl) silyl, (methoxy) (dimethyl) silyl, (methoxy) (dichloro) silyl, triethoxysilyl, (diethoxy) (methyl) silyl, (ethoxy) (dimethyl) silyl, (dimethoxy) (ethoxy) silyl, (methoxy) (diethoxy)silyl, and tripropoxysilyl groups, and the like.

The degree of introduction of modifying groups to polymer chain ends of the ring-opened copolymer according to the present invention is expressed as a percentage of the number of ring-opened copolymer chain ends to which modifying groups are introduced with respect to the total number of ring-opened copolymer chain ends, and is preferably 10% or more, more preferably 20% or more, still more preferably 30% or more, particularly preferably 40% or more, although not particularly limited thereto. A higher degree of introduction of modification groups is preferable because such a value indicates higher compatibility with filler such as silica, and leads to further improving in processability and tensile strength and elongation characteristics when made into a cross-linked rubber. The degree of introduction of modification groups to polymer chain ends can be measured by any method. For example, in the case where an oxysilyl group is introduced as the terminal modifying group, the degree can be determined from the peak area ratio corresponding to oxysilyl group determined by $^1$H-NMR and the number average molecular weight determined by gel permeation chromatography.

The ring-opened copolymer used in the present invention has a Mooney viscosity (ML1+4, 100° C.) of preferably 20 to 150, more preferably 22 to 120, still more preferably 25 to 90.

The ring-opened copolymer used in the present invention can be produced by any method. Examples of such methods include, but are not limited to, copolymerization of the norbornene compound represented by general formula (1) and the monocyclic olefin in the presence of a ring-opening polymerization catalyst.

The ring-opening polymerization catalyst catalyzes ring-opening copolymerization of the norbornene compound represented by general formula (1) and the monocyclic olefin, and is preferably a ruthenium-carbene complex because of its ability to suitably control the cis/trans ratio.

Specific examples of the ruthenium-carbene complex include bis(tricyclohexylphosphine)benzylidene ruthenium dichloride, bis(triphenylphosphine)-3,3-diphenylpropenylidene ruthenium dichloride, bis(tricyclohexylphosphine) t-butylvinylidene ruthenium dichloride, dichloro-(3-phenyl-1H-inden-1-ylidene)bis(tricyclohexylphosphine) ruthenium, bis(1,3-diisopropylimidazolin-2-ylidene)benzylidene ruthenium dichloride, bis(1,3-dicyclohexylimidazolin-2-ylidene) benzylidene ruthenium dichloride, (1,3-dimesitylimidazolin-2-ylidene) (tricyclohexylphosphine)benzylidene ruthenium dichloride, (1,3-dimesitylimidazolidin-2-ylidene) (tricyclohexylphosphine)benzylidene ruthenium dichloride, bis(tricyclohexylphosphine)ethoxymethylidene ruthenium dichloride, (1,3-dimesitylimidazolidin-2-ylidene) (tricyclohexylphosphine)ethoxymethylidene ruthenium dichloride, and the like. These ring-opening polymerization catalysts may be used alone or in any mixture thereof.

The amount of the ring-opening polymerization catalyst to be used is expressed as a molar ratio (ring-opening polymerization catalyst:monomers used in copolymerization), and is in the range of typically 1:500 to 1:2,000,000, preferably 1:700 to 1:1,500,000, more preferably 1:1,000 to 1:1,000,000.

The polymerization reaction may be performed in the absence of a solvent or in a solution. In the case of copolymerization in a solution, the solvent used may be any solvent which is inert during the polymerization reaction and can dissolve compounds used in the copolymerization including the norbornene compound represented by general formula (1), the monocyclic olefin, and the polymerization catalyst. Preferred are hydrocarbon-based solvents and halogen-containing solvents. Specific examples of the hydrocarbon-based solvents include aromatic hydrocarbons such as benzene, toluene, xylene, and ethylbenzene; aliphatic hydrocarbons such as hexane, n-heptane, and n-octane; alicyclic hydrocarbons such as cyclohexane, cyclopentane, and methylcyclohexane; and the like. Specific examples of the halogen-containing solvents include haloalkanes such as dichloromethane and chloroform; aromatic halogens such as chlorobenzene and dichlorobenzene; and the like. These solvents may be used alone or in combination.

In the process of ring-opening polymerization of the norbornene compound represented by general formula (1) and the monocyclic olefin, in order to adjust the molecular weight of the resulting ring-opened copolymer, an olefin compound or a diolefin compound may be optionally added as a molecular weight modifier to the polymerization system.

The olefin compound may be any organic compound having an ethylenically unsaturated bond. Examples thereof include, but are not limited to, α-olefins such as 1-butene, 1-pentene, 1-hexene, and 1-octene; styrene compounds such as styrene and vinyltoluene; halogen-containing vinyl compounds such as acryl chloride; alkenyl alcohols such as allyl alcohol and 5-hexenol; silicon-containing vinyl compounds such as allyltrimethoxysilane, allyltriethoxysilane, allyltrichlorosilane, and styryltrimethoxysilane; disubstituted olefins such as 2-butene and 3-hexene; and the like.

Examples of the diolefin compound include non-conjugated diolefins such as 1,4-pentadiene, 1,4-hexadiene, 1,5-hexadiene, 1,6-heptadiene, 2-methyl-1,4-pentadiene, and 2,5-dimethyl-1,5-hexadiene.

The amount of the olefin compound or the diolefin compound used as the molecular weight modifier can be appropriately selected according to the molecular weight of the resulting ring-opened copolymer, and the amount thereof expressed as a molar ratio to the monomers used in copolymerization is typically 1/100 to 1/100,000, preferably 1/200 to 1/50,000, more preferably 1/500 to 1/10,000.

In the case where the ring-opened copolymer used in the present invention is prepared as a copolymer having modifying groups at polymer chain ends, a modifying group-containing olefinically unsaturated hydrocarbon compound is preferably used as a molecular weight modifier instead of the olefin compound and the diolefin compound. In the presence of such a modifying group-containing olefinically unsaturated hydrocarbon compound, the copolymerization can result in a ring-opened copolymer in which the modifying group is suitably introduced to polymer chain ends.

The modifying group-containing olefinically unsaturated hydrocarbon compound may be any compound having the modifying group and one metathesis polymerizable olefinic carbon-carbon double bond, although not particularly limited thereto. For example, in order to introduce oxysilyl groups to polymer chain ends of the ring-opened copolymer, an oxysilyl group-containing olefinically unsaturated hydrocarbon is added to the polymerization reaction system.

As examples of such oxysilyl group-containing olefinically unsaturated hydrocarbons, the following compounds can be mentioned. Hydrocarbons for introducing the modifying group to only one end (single end) of the polymer chains of the ring-opened copolymer include alkoxysilane compounds such as vinyl(trimethoxy)silane, vinyl(triethoxy)silane, allyl(trimethoxy)silane, allyl (methoxy) (dimethyl) silane, allyl(triethoxy)silane, allyl(ethoxy) (dimethyl)silane, styryl(trimethoxy)silane, styryl(triethoxy)silane, styrylethyl (triethoxy)silane, allyl(triethoxysilylmethyl)ether, and allyl (triethoxysilylmethyl) (ethyl)amine; aryloxysilane compounds such as vinyl(triphenoxy)silane, allyl(triphenoxy) silane, and allyl(phenoxy) (dimethyl)silane; acyloxysilane compounds such as vinyl(triacetoxy)silane, allyl(triacetoxy) silane, allyl(diacetoxy)methylsilane, and allyl(acetoxy) (dimethyl)silane; alkylsiloxysilane compounds such as allyltris (trimethylsiloxy)silane; arylsiloxysilane compounds such as allyltris(triphenylsiloxy)silane; polysiloxane compounds such as 1-allylheptamethyltrisiloxane, 1-allylnonamethyltetrasiloxane, 1-allylnonamethylcyclopentasiloxane, and 1-allylundecamethylcyclohexasiloxane; and the like.

Hydrocarbons for introducing the modifying group to both polymer chain ends (both ends) of the ring-opened copolymer include alkoxysilane compounds such as bis (trimethoxysilyl)ethylene, bis(triethoxysilyl)ethylene, 1,4-bis(trimethoxysilyl)-2-butene, 1,4-bis(triethoxysilyl)-2-butene, and 1,4-bis(trimethoxysilylmethoxy)-2-butene; aryloxysilane compounds such as 1,4-bis(triphenoxysilyl)-2-butene; acyloxysilane compounds such as 1,4-bis(triacetoxysilyl)-2-butene; alkylsiloxysilane compounds such as 1,4-bis[tris(trimethylsiloxy)silyl]-2-butene; arylsiloxysilane compounds such as 1,4-bis[tris(triphenylsiloxy)silyl]-2- butene; polysiloxane compounds such as 1,4-bis(heptamethyltrisiloxy)-2-butene, and 1,4-bis(undecamethylcyclohexasiloxy)-2-butene; and the like.

The modifying group-containing olefinically unsaturated hydrocarbon compounds such as oxysilyl group-containing olefinically unsaturated hydrocarbons not only act to introduce the modifying group to polymer chain ends of the ring-opened copolymer but also act as molecular weight modifiers. Due to this nature, the amount of the modifying group-containing olefinically unsaturated hydrocarbon compound to be used can be appropriately selected according to the molecular weight of the resulting ring-opened copolymer, and the amount thereof expressed as a molar ratio to the monomers used in copolymerization is in the range of typically 1/100 to 1/100,000, preferably 1/200 to 1/50,000, more preferably 1/500 to 1/10,000.

The polymerization temperature is preferably −100° C. or higher, more preferably −50° C. or higher, still more preferably 0° C. or higher, particularly preferably 20° C. or higher, although not particularly limited thereto. The upper limit of the polymerization temperature is preferably lower than 120° C., more preferably lower than 100° C., still more preferably lower than 90° C., particularly preferably 80° C. or lower, although not particularly limited thereto. Although the polymerization reaction time is also not particularly limited, it is preferably 1 minute to 72 hours, more preferably 10 minutes to 20 hours.

To the ring-opened copolymer obtained by the polymerization reaction may be optionally added an antioxidant such as a phenol-based stabilizer, a phosphorus-based stabilizer, or a sulfur-based stabilizer. The amount of the antioxidant to be added can be determined according to factors such as the type thereof. Additionally, an extender oil may also be added if needed. In the case where the ring-opened copolymer is prepared as a polymer solution, any known recovery method can be used to recover the ring-opened copolymer from the polymer solution. Examples of such methods include a method involving removing the solvent by steam stripping or the like, filtering out the solid, and drying the residue to afford the ring-opened copolymer as a solid; and the like.

<Ring-Opened Copolymer Composition>

The ring-opened copolymer composition according to the present invention contains, in addition to the ring-opened copolymer described above, a norbornene compound represented by the above general formula (1) in a ratio of 1 ppm by weight or more and 1000 ppm by weight or less based on 100% by weight of the ring-opened copolymer described above.

According to the present invention, by containing the norbornene compound represented by the above general formula (1) in the ring-opened copolymer described above at the above content, the ring-opened copolymer composition thus constituted can be made to have excellent heat aging resistance and good processability, and further, the ring-opened copolymer composition thus constituted can give a cross-linked rubber having excellent tensile strength and elongation characteristics.

As the norbornene compound represented by the above general formula (1) contained in the ring-opened copolymer composition according to the present invention, the same compounds as those used for forming the structural unit derived from the norbornene compound constituting the ring-opened copolymer described above can be used, and suitable examples thereof can be the same.

In the ring-opened copolymer composition according to the present invention, the content ratio of the norbornene compound represented by the above general formula (1) is 1 ppm by weight or more and 1000 ppm by weight or less based on 100% by weight of the ring-opened copolymer described above, and is preferably 2 ppm by weight or more, 900 ppm by weight or less, more preferably 3 ppm by weight or more, 850 ppm by weight or less, still more preferably 5 ppm by weight or more, 800 ppm by weight or less, particularly preferably 20 ppm by weight or more and 400 ppm by weight or less. If the content ratio of the norbornene compound represented by the above general formula (1) is too small, together with inferior processability as a ring-opened copolymer composition, the obtained cross-linked rubber becomes inferior in tensile strength and elongation characteristics, whereas, if the content ratio of the norbornene compound represented by the above general formula (1) is too large, the obtained cross-linked rubber is inferior in tensile strength, elongation characteristics, and heat aging resistance. Note that, in the ring-opened copolymer composition, the content ratio of the norbornene compound represented by the above general formula (1) can be measured using, for example, gas chromatography or the like.

A method of containing the norbornene compound represented by the above general formula (1) in the ring-opened copolymer at the above content ratio is not particularly limited, and examples thereof include a method of adding the norbornene compound represented by the above general formula (1) to the above-described ring-opened copolymer at the above content ratio, and a method of adjusting a residual amount of the norbornene compound represented by the above general formula (1) in the ring-opened copolymer, which is used as a monomer to be subjected to polymerization when obtaining the above-described ring-opened copolymer by ring-opening copolymerization. In particular, when the ring-opened copolymer described above is obtained by ring-opening copolymerization, since the norbornene compound represented by the above general formula (1) inevitably remains unreacted in many cases, the method of adjusting the amount of such unreacted norbornene compound represented by the above general formula (1) is preferred.

The method of adjusting the amount of the norbornene compound represented by the above general formula (1) as an unreacted monomer in the ring-opened copolymer obtained by ring-opening copolymerization is not particularly limited, but a method of performing a purification operation on the ring-opened copolymer containing the norbornene compound represented by the above general formula (1) as an unreacted monomer is suitably mentioned.

As the purification operation, for example, a solid ring-opened copolymer containing the norbornene compound represented by the above general formula (1) as an unreacted monomer obtained by coagulating a polymer solution of the ring-opened copolymer obtained by the above-described polymerization reaction is redissolved in a solvent which dissolves these to obtain a polymer composition solution, and then an operation of separating a solvent using a steam stripping or using an alcohol such as methanol and isopropanol, solidifying the solvent, and drying the mixture by vacuum drying and the like is performed, and such the operation is performed one times or a plurality of times. Alternatively, as the purification operation, when obtaining a solid ring-opened copolymer from the polymer solution of the ring-opened copolymer obtained by the above-described polymerization reaction, the polymer solution is added to a large excess of boiling water in which steam having a temperature of 110 to 130° C., preferably 115 to 125° C., is jetted, so that the solvent is removed by steam stripping for 5 minutes or more, preferably 10 to 20 minutes (that is, by steam stripping under a relatively excessive condition as compared with a case of simply coagulating), and then coagulating and drying by vacuum drying or the like are performed. Also, these methods may be combined.

In particular, according to such a purification operation, a part of the norbornene compound represented by the above general formula (1) as an unreacted monomer can be dissolved in the polymerization solvent contained in the polymer solution at the time of coagulation, in the solvent used for preparing the polymer composition solution, in the steam used in steam stripping, or in the alcohol such as methanol and isopropanol, and thus can be separated from the ring-opened copolymer. Then, according to the present invention, it is possible to adjust the content ratio of the norbornene compound represented by the above general formula (1) by appropriately selecting the condition and the number of times when performing such a purification operation.

Note that, in the purification operation, the solvent used when the solid ring-opened copolymer is redissolved is not particularly limited, and any solvent can be used as long as it can dissolve the norbornene compound represented by the above general formula (1) as an unreacted monomer and the ring-opened copolymer, and examples thereof include aromatic hydrocarbons such as benzene, toluene, xylene, and ethylbenzene; aliphatic hydrocarbons such as hexane, n-heptane, and n-octane; alicyclic hydrocarbons such as cyclohexane, cyclopentane, and methylcyclohexane; and the like. Further, examples of the halogen-based solvent include haloalkanes such as dichloromethane and chloroform; aromatic halogens such as chlorobenzene and dichlorobenzene; and the like. In addition, an anti-aging agent may be appropriately contained in the solvent used in the purification operation.

<Rubber Composition>

The rubber composition according to the present invention contains the ring-opened copolymer composition according to the present invention described above. In the rubber composition according to the present invention, necessary amounts of compounding agents such as a cross-linking agent, a cross-linking accelerator, a cross-linking activator, a process oil, a filler, an anti-aging agent, an activator, a plasticizer, and a lubricant may be added to the above-described ring-opened copolymer composition according to the present invention in a conventional manner.

Examples of the cross-linking agent include sulfurs such as powdered sulfur, precipitated sulfur, colloidal sulfur, insoluble sulfur, and highly dispersible sulfur; halogenated sulfurs such as sulfur monochloride and sulfur dichloride; organic peroxides such as dicumyl peroxide and ditertiary butyl peroxide; quinone dioximes such as p-quinone dioxime and p,p'-dibenzoylquinone dioxime; organic polyvalent amine compounds such as triethylenetetramine, hexamethylenediamine carbamate, and 4,4'-methylene bis-o-chloroaniline; alkylphenol resins having a methylol group; and the like. Among these, sulfurs are preferred, and powdered sulfur is more preferred. These cross-linking agents are used alone or in combination. The amount of the cross-linking agent to be added is preferably 0.1 to 15 parts by weight, more preferably 0.5 to 5 parts by weight with respect to 100 parts by weight of rubber components in the rubber composition.

Examples of the cross-linking accelerator include sulfenamide-based cross-linking accelerators such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide, and N,N'-diisopropyl-2-benzothiazolylsulfenamide; guanidine-based cross-linking accelerators such as 1,3-diphenylguanidine, 1,3-di-ortho-tolylguanidine, and 1-ortho-tolylbiguanidine; thiourea-based cross-linking accelerators such as diethylthiourea; thiazole-based cross-linking accelerators such as 2-mercaptobenzothiazole, dibenzothiazyl disulfide, and zinc 2-mercaptobenzothiazole; thiuram-based cross-linking accelerators such tetramethylthiuram monosulfide and tetramethylthiuram disulfide; dithiocarbamic acid-based cross-linking accelerators such as sodium dimethyldithiocarbamate and zinc diethyldithiocarbamate; xanthogenic acid-based cross-linking accelerators such as sodium isopropyl xanthate zinc isopropyl xanthate, and zinc butyl xanthate; and the like. Among these, those containing sulfenamide-based cross-linking accelerators are particularly preferable. These cross-linking accelerators are used alone or in combination. The amount of the cross-linking accelerator to be added is preferably 0.1 to 15 parts by weight, more preferably 0.5 to 5 parts by weight with respect to 100 parts by weight of the rubber components in the rubber composition.

As the cross-linking activator, a higher fatty acid such as stearic acid, zinc oxide, or the like can be used. The amount of the cross-linking activator to be added can be appropriately selected. In the case of a higher fatty acid, the amount thereof to be added is preferably 0.05 to 15 parts by weight, more preferably 0.5 to 5 parts by weight with respect to 100 parts by weight of the rubber components in the rubber composition. In the case of zinc oxide, the amount thereof to be added is preferably 0.05 to 10 parts by weight, more preferably 0.5 to 3 parts by weight with respect to 100 parts by weight of the rubber components in the rubber composition.

As the process oil, a mineral oil or a synthetic oil may be used. As the mineral oil, an aroma oil, a naphthenic oil, a paraffin oil, or the like is typically used. Examples of other compounding agents include activators such as diethylene glycol, polyethylene glycol, and silicone oil; fillers other than silica such as carbon black, calcium carbonate, talc, and clay; tackifiers such as a petroleum resin and coumarone resin; waxes; and the like.

Examples of the filler include carbon black and silica. Examples of the carbon black include furnace black, acetylene black, thermal black, channel black, and graphite. Among these, furnace black is preferable, and examples thereof include SAF, ISAF, ISAF-HS, ISAF-LS, IISAF-HS, HAF, HAF-HS, HAF-LS, FEF, and the like. These carbon blacks may be used alone or in combination.

The nitrogen adsorption specific surface area ($N_2SA$) of the carbon black is preferably from 5 to 200 $m^2/g$, more preferably from 80 to 130 $m^2/g$, and the dibutyl phthalate (DBP) adsorption amount is preferably from 5 to 300 ml/100 g, more preferably from 80 to 160 ml/100 g.

Examples of silica include, but are not limited to, dry process white carbon, wet process white carbon, colloidal silica, precipitated silica, and the like. Further, a carbon-silica dual phase filler comprising carbon black and silica supported on the surface thereof may be used. Preferred among these is wet process white carbon mainly composed of hydrous silicic acid. These may be used alone or in combination.

The silica preferably has a nitrogen adsorption specific surface area of 50 to 300 $m^2/g$, more preferably 80 to 220 $m^2/g$, particularly preferably 100 to 170 $m^2/g$. Silica having a specific surface area within these ranges has a particularly preferable level of compatibility with the ring-opened copolymer. Further, the pH of the silica is preferably less than 7, more preferably 5 to 6.9. Note that the nitrogen adsorption specific surface area can be measured in accordance with ASTM D3037-81 by the BET method.

The amount of the filler in the rubber composition according to the present invention is preferably 10 to 150 parts by weight, more preferably 20 to 120 parts by weight, further preferably 40 to 100 parts by weight with respect to 100 parts by weight of the rubber component.

When using silica as the filler, a silane coupling agent is preferably further mixed in the rubber composition according to the present invention in order to further enhance the compatibility between the ring-opened copolymer and the silica. Examples of the silane coupling agent include vinyltriethoxysilane, β-(3,4-epoxycyclohexyl)ethyltrimethoxysilane, N-(β-aminoethyl)-γ-aminopropyltrimethoxysilane, bis(3-(triethoxysilyl)propyl)tetrasulfide, and bis(3-(triethoxysilyl)propyl)disulfide; and tetrasulfides described in Japanese Patent Laid-Open No. 6-248116, such as γ-trimethoxysilylpropyldimethylthiocarbamyl tetrasulfide and γ-trimethoxysilylpropylbenzothiazyl tetrasulfide. Among these, the tetrasulfides are preferable. These silane coupling agents may be used alone or in combination. The amount of the silane coupling agent to be added is preferably 0.1 to 30 parts by weight, more preferably 1 to 15 parts by weight with respect to 100 parts by weight of the silica.

Further, the rubber composition according to the present invention contains the above-mentioned ring-opened copolymer, but may further contain a rubber other than the above-mentioned ring-opened copolymer as a rubber component. Examples of such rubbers other than the above-mentioned ring-opened copolymer include natural rubber (NR), polyisoprene rubber (IR), emulsion polymerized SBR (styrene-butadiene copolymer rubber), solution polymerized random SBR (bound styrene: 5 to 50% by weight, 1,2-bond content in butadiene units: 10 to 80%), high trans SBR (trans bond content in butadiene units: 70 to 95%), low cis BR (polybutadiene rubber), high cis BR, high trans BR (trans bond content in butadiene units: 70 to 95%), styrene-isoprene copolymer rubber, butadiene-isoprene copolymer rubber, emulsion polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer, acrylic rubber, epichlorohydrin rubber, fluororubber, silicon rubber, ethylene-propylene rubber, urethane rubber, and the like. Among these, NR, BR, IR, and SBR are preferably used. These rubbers can be used alone or in combination.

The content of the ring-opened copolymer in the rubber composition according to the present invention is preferably 10% by weight or more, more preferably 20% by weight or more, particularly preferably 30% by weight or more with respect to the total rubber components. Too low a content thereof may not be effective in enhancing tensile strength, elongation characteristics and heat aging resistance.

The rubber composition according to the present invention can be obtained by kneading the components by an ordinary method. For example, the rubber composition can be obtained by kneading the compounding agents other than the cross-linking agent and the cross-linking accelerator with the rubber components including the above-mentioned ring-opened copolymer, and then by mixing the cross-linking agent and the cross-linking accelerator with the kneaded product. The kneading temperature of the compounding agents other than the cross-linking agent and the cross-linking accelerator with the rubber components including the ring-opened copolymer is preferably 80 to 200° C., more preferably 120 to 180° C., and the kneading time is preferably 30 seconds to 30 minutes. The cross-linking agent and the cross-linking accelerator are added after cooling the kneaded product to typically 100° C. or lower, preferably to 80° C. or lower.

<Cross-Linked Rubber>

The cross-linked rubber according to the present invention is obtained by cross-linking the above-described rubber composition according to the present invention.

The cross-linked rubber according to the present invention can be produced using the rubber composition according to the present invention, for example, by molding with a molding machine enabling molding into a desired shape such as an extruding machine, an injection molding machine, a compressor and a roll, performing a cross-linking reaction by heating, and fixing the shape as a cross-linked product. In this case, the cross-linking may be performed after performing molding beforehand, or simultaneously with the molding. The molding temperature is typically 10 to 200° C., and preferably 25 to 120° C. The cross-linking temperature is typically 100 to 200° C., preferably 130 to 190° C.; the cross-linking time is typically 1 minute to 24 hours, preferably 2 minutes to 12 hours, particularly preferably 3 minutes to 6 hours.

Depending on the shape, the size, and the like thereof, the inside of the cross-linked rubber may not be sufficiently cross-linked even when the surface thereof is cross-linked. To avoid this, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus obtained has excellent tensile strength, elongation properties, and heat aging resistance. Due to these properties, the cross-linked rubber according to the present invention can be used, for example, in the following various applications: materials for tire parts in tires such as cap treads, base treads, carcasses, side walls, and beads; materials for various industrial products such as hoses, belts, mats, antivibration rubber, and others; rebound resilience improvers for resins; resin film buffers; shoe soles; rubber shoes; golf balls; toys; and the like. Additionally, the cross-linked rubber according to the present invention can be suitably used in tire parts such as treads, carcasses, side walls, and beads in various tires such as all-season tires, high-performance tires, and studless tires.

EXAMPLES

The present invention is hereinafter illustrated in greater detail with reference to Examples. However, the present invention should not be construed as limited to these examples. In the following examples, all "part(s)" are on a weight basis unless otherwise indicated. Tests and evaluations were performed according to the following methods.

<Amount of Norbornene Compound Represented by General Formula (1) in Ring-Opened Copolymer Composition>

1 parts of the ring-opened copolymer composition was dissolved in 10 parts of toluene, and the amount of the norbornene compound represented by the general formula (1) in the ring-opened copolymer composition was measured using gas chromatography (GC-6850A manufactured by Agilent Technology Co., Ltd.) with respect to 100% by weight of the ring-opened copolymer in the ring-opened copolymer composition.

<Molecular Weight>

The number average molecular weight (Mn), the weight average molecular weight (Mw), and the molecular weight distribution (Mw/Mn) of each ring-opened copolymer were determined as values measured against polystyrene standards by gel permeation chromatography (GPC) using tetrahydrofuran as a solvent.

<Ratio of Each Monomer Units in Ring-Opened Copolymer>

The ratios of the monomer units constituting the ring-opened copolymer were determined by $^1$H-NMR spectrometry.

<Cis/Trans Ratio of Double Bonds in Main Chain>

The cis/trans ratio of double bonds in the main chain of each ring-opened copolymer was determined by $^{13}$C-NMR spectrometry.

<Glass Transition Temperature (Tg)>

The glass transition temperature of each ring-opened copolymer was measured with a differential scanning calorimeter (DSC) at a temperature increase rate of 10° C./min.

<Heat Aging Test (Increase Rate of Insoluble Fraction)>

A portion of the ring-opened copolymer composition was collected, and the toluene insoluble content was measured, and the remainder was placed in an oven at 80° C. and left for 8 days to be thermally aged. The amount of toluene insoluble content of the ring-opened copolymer composition after thermal aging was measured, and the ratio of the increase in the amount of toluene insoluble fraction before and after thermal aging to the ring-opened copolymer composition was set as an increase rate of insoluble fraction (increase rate of insoluble fraction [% by weight]=[{(amount of toluene insoluble fraction after thermal aging [g])−(amount of toluene insoluble fraction before thermal aging [g])}/(amount of ring-opened copolymer composition used in the test [g])]×100), which was used as an indicator of heat aging resistance. The smaller the increase rate of insoluble fraction, the better the heat aging resistance. The method for measuring the amount of toluene insoluble was as follows. In other words, a ring-opened copolymer composition was added to toluene so as to be 1% by weight, and the mixture was stirred overnight and day. Then, the filter residue was filtered through a 100 mesh filter, and the filter residue (filter residue left on the filter) was dried under vacuum at room temperature, and then the filter residue weight was measured, which was used as a toluene insoluble content.

<Processability of Rubber Composition>

The Mooney viscosity (ML1+4, 100° C.) of the rubber composition was measured according to JIS K6300 using a Mooney viscometer (manufactured by Shimadzu Corporation). This value is shown as an index with the measurement value of Comparative Example 1 set to 100 for Examples 1 and 2 and Comparative Example 2, as an index with the measurement value of Comparative Example 3 set to 100 for Example 3, as an index with the measurement value of Comparative Example 4 set to 100 for Example 4, and as an index with the measurement value of Comparative Example 5 set to 100 for Example 5, respectively. It can be said that the smaller the index, the lower the Mooney viscosity and the better the processability.

<Tensile Strength and Elongation>

Each cross-linkable rubber composition sample was cross-linked by pressing at 160° C. for 20 minutes to prepare a test piece, and a dumbbell-shaped test piece in the shape of dumbbell No. 6 was punched out from the resulting cross-linked sheet in the direction parallel to the grain direction. The dumbbell-shaped test piece was assessed for tensile strength and elongation at break (hereinafter, referred to as elongation) by a tensile test using a tensile tester (product name "TENSOMETER 10K", available from ALPHA TECHNOLOGIES, load cell 1 kN) at 23° C. at 500 mm/min in accordance with JIS K 6251:2010. The measured results of tensile strength and elongation are shown as an index with the measured value of Comparative Example 1 set to 100 for Examples 1 and 2 and Comparative Example 2, an index with the measured value of Comparative Example 3 set to 100 for Example 3, an index with the measured value of Comparative Example 4 set to 100 for Example 4, and an index with the measured value of Comparative Example 5 set to 100 for Example 5, respectively. It can be said that the higher the index, the greater the tensile strength and elongation, and the better.

<Tensile Strength and Elongation after Heat Aging>

The cross-linked sheet obtained in the same manner as described above was heat-aged in an oven by placing in the oven at 120° C. for 72 hours. Then, a dumbbell-shaped test piece in the shape of dumbbell No. 6 was punched out from the cross-linked sheet after heat aging in the direction parallel to the grain direction, and the tensile strength and elongation after heat aging were measured by the same method as described above. The measurement results of tensile strength and elongation after heat aging are shown in terms of the ratio to the tensile strength and elongation (%) before heat aging, i.e. the rate of change (%), respectively. Specifically, the change rate (%) of the tensile strength after heat aging=[{tensile strength after heat aging (MPa)}/{tensile strength before heat aging (MPa)}]×100, and the change rate (%) of the elongation after heat aging=[{elongation after heat aging (%)}×{elongation before heat aging (%)}]×100. That is, as the rate of change (%) of the tensile strength and elongation after heat aging deviates from 100%, the change due to heat aging becomes larger. Therefore, it can be said that the closer the change rate (%) of the tensile strength and elongation after heat aging is to 100%, the smaller the change due to heat aging and the better the heat resistance.

Comparative Example 1

Under a nitrogen atmosphere, 400 parts of 2-norbornene as a norbornene compound represented by the above general formula (1), 400 parts of cyclopentene as a monocyclic olefin, 1576 parts of toluene, and 0.96 parts of 1-hexene were placed in a glass reactor with a stirrer. Subsequently, 0.048 parts of dichloro-(3-phenyl-1H-inden-1-ylidene)bis(tricyclohexylphosphine)ruthenium (II) dissolved in 40 parts of toluene was added thereto to cause the polymerization reaction to proceed at room temperature for 4 hours. After the polymerization reaction, an excess of vinyl ethyl ether was added to terminate the polymerization reaction so as to obtain a polymer solution. Incidentally, a portion of the obtained polymer solution was stored separately for use in Example 2 described later.

The obtained polymer solution was poured into a large excess of methanol containing 2,6-di-t-butyl-p-cresol (BHT), and the precipitated polymer was collected and washed with methanol, and was then vacuum dried at 50° C. for 3 days to afford 372 parts of a ring-opened copolymer composition (A-1). The resulting ring-opened copolymer in the ring-opened copolymer composition (A-1) had a number average molecular weight (Mn) of 155,000, a weight average molecular weight (Mw) of 365,000, a 2-norbornene structural unit/cyclopentene structural unit ratio of 72/28 (on a weight basis), a cis/trans ratio of 17/83, a glass transition temperature (Tg) of −4° C. In addition, in the obtained ring-opened copolymer composition (A-1), the content of the 2-norbornene with respect to 100% by weight of the ring-opened copolymer was 1,500 ppm by weight. Then, using the obtained ring-opened copolymer composition (A-1), a heat aging test (increase rate of insoluble fraction) was performed. The results are shown in Table 1.

Example 1

A part of the ring-opened copolymer composition (A-1) obtained in Comparative Example 1 described above was used, and a purification operation was performed. Specifically, 124 parts of the ring-opened copolymer composition (A-1) was dissolved in 1,000 parts of toluene to obtain a toluene solution of the ring-opened copolymer composition (A-1). Then, this toluene solution was poured into a large excess of methanol containing 2,6-di-t-butyl-p-cresol (BHT) to recover the precipitated polymer composition. Then, the recovered polymer composition was washed with methanol and then dried under vacuum at 60° C. for 5 days to obtain 122 parts of the ring-opened copolymer composition (A-2). The number average molecular weight (Mn) of the ring-opened copolymer in the obtained ring-opened copolymer composition (A-2) was 178,000, the weight average molecular weight (Mw) was 372,000, the 2-norbornene structural unit/cyclopentene structural unit ratio was 72/28 (on a weight ratio), the cis/trans ratio was 17/83, and the glass transition temperature (Tg) was −4° C. In addition, in the obtained ring-opened copolymer composition (A-2), the content of the 2-norbornene with respect to 100% by weight of the ring-opened copolymer was 140 ppm by weight. Then, using the obtained ring-opened copolymer composition (A-2), a heat aging test (increase rate of insoluble fraction) was performed. The results are shown in Table 1.

Example 2

To the polymer solution after the polymerization reaction obtained in Comparative Example 1 described above, 0.2 parts of 2,6-di-t-butyl-p-cresol (BHT) as an anti-aging agent was added with respect to 100 parts of the rubber component. Then, to a large excess of boiling water in which steam at a temperature of 120° C. was jetted, 600 parts of this polymer solution was gradually added while being applied to steam, and then the solvent was removed by steam stripping for 15 minutes, and then dried under vacuum at 60° C. for 72 hours to obtain 122 parts of the ring-opened copolymer composition (A-3). The number average molecular weight (Mn) of the ring-opened copolymer in the obtained ring-opened copolymer composition (A-3) was 151,000, the weight average molecular weight (Mw) was 358,000, the 2-norbornene structural unit/cyclopentene structural unit ratio was 72/28 (on a weight ratio), the cis/trans ratio was 17/83, and the glass transition temperature (Tg) was −4° C. In addition, in the obtained ring-opened copolymer composition (A-3), the content of the 2-norbornene with respect to 100% by weight of the ring-opened copolymer was 85 ppm by weight. Then, using the obtained ring-opened copolymer composition (A-3), a heat aging test (increase rate of insoluble fraction) was performed. The results are shown in Table 1.

Comparative Example 2

A part of the ring-opened copolymer composition (A-1) obtained in Comparative Example 1 described above was used, and a purification operation was performed. Specifically, 124 parts of the ring-opened copolymer composition (A-1) was dissolved in 1000 parts of toluene to obtain a toluene solution of the ring-opened copolymer composition (A-1). Then, this toluene solution was poured into a large excess of methanol containing 2,6-di-t-butyl-p-cresol (BHT), and 122 parts of the precipitated polymer composition was recovered. Further, 122 parts of the obtained polymer composition was dissolved in 5,000 parts of toluene, and this toluene solution was poured into a large excess of methanol containing 2,6-di-t-butyl-p-cresol (BHT) to recover the precipitated polymer composition. Then, after washing the recovered polymer composition with methanol, the polymer composition was stretched into a sheet having a thickness of 1 mm, and dried under vacuum at 60° C. for 14 days to obtain 119 parts of the ring-opened copolymer composition (A-4). The number average molecular weight (Mn) of the ring-opened copolymer in the obtained ring-opened copolymer composition (A-4) was 187,000, the weight average molecular weight (Mw) was 374,000, the 2-norbornene structural unit/cyclopentene structural unit ratio was 72/28 (on a weight ratio), the cis/trans ratio was 17/83, and the glass transition temperature (Tg) was −4° C. In addition, in the obtained ring-opened copolymer composition (A-4), the content of the 2-norbornene with respect to 100% by weight of the ring-opened copolymer was 0.8 ppm by weight. Then, using the obtained ring-opened copolymer composition (A-4), a heat aging test (increase rate of insoluble fraction) was performed. The results are shown in Table 1.

<<Preparation of Rubber Composition>>

100 Parts of the ring-opened copolymer composition (A-2) obtained in Example 1 was masticated using a Banbury mixer. Next, 40 parts of silica (product name "Zeosil 1165MP", available from Rhodia, nitrogen adsorption specific surface area (BET method): 163 m²/g), and 3 parts of a silane coupling agent (bis(3-(triethoxysilyl)propyl)tetrasulfide, product name "Si69", available from Degussa) were added thereto, and the mixture was kneaded at a starting temperature of 110° C. for 1.5 minutes. To the kneaded product, 3 parts of zinc oxide (zinc flower No. 1), 2.0 parts of stearic acid (product name "SA-300", available from Adeka corporation), and 2.0 parts of an anti-aging agent (N-phenyl-N'-(1,3-dimethylbutyl)-p-phenylenediamine, product name "NOCLAK 6C", available from Ouchi Shinko Chemical Industrial Co., LTD.) were added. The resulting mixture was kneaded for 2.5 minutes, and the resulting rubber composition was discharged from the Banbury mixer. When the kneading was completed, the temperature of the rubber composition was 150° C. After cooled to room temperature, the rubber composition was kneaded again in the Banbury mixer for 3 minutes, and was then discharged from the Banbury mixer.

Then, a portion of the obtained rubber composition was sampled to evaluate processability. The results are shown in Table 1.

<<Preparation of Cross-Linkable Rubber Composition>>

In an open roll mixer at 50° C., using the total amount of the rubber composition obtained above, to this, 1.5 parts of sulfur, and 0.9 parts of a cross-linking accelerator (di-2-benzothiazolyldisulfide, available from Ouchi Shinko Chemical Co., Ltd., product name "Nocceler-DM"), 0.6 parts of a cross-linking accelerator (1,3-di-o-tolylguanidine, available from Ouchi Shinko Chemical Co., Ltd., product name "Nocceler-DT"), and 0.1 parts of a cross-linking accelerator (tetramethylthiuram monosulfide, available from Ouchi Shinko Chemical Co., Ltd., product name "Nocceler TS") were kneaded, and then a sheet-like rubber composition was prepared. Using the obtained cross-linkable rubber composition, the tensile strength and elongation in the normal state, and the tensile strength and elongation after heat aging were measured according to the above method. The results are shown in Table 1.

Further, a rubber composition and a cross-linkable rubber composition were prepared in the same manner as described above for the ring-opened copolymer composition (A-3) obtained in Example 2, the ring-opened copolymer composition (A-1) obtained in Comparative Example 1, and the ring-opened copolymer composition (A-4) obtained in Comparative Example 2, and evaluated in the same manner. The results are shown in Table 1.

ring-opened copolymer composition (B-1), a heat aging test (increase rate of insoluble fraction) was performed. The results are shown in Table 2.

Example 3

A part of the ring-opened copolymer composition (B-1) obtained in Comparative Example 3 described above was used, and a purification operation was performed. Specifically, 160 parts of the ring-opened copolymer composition (B-1) was dissolved in 1,500 parts of toluene to obtain a toluene solution of the ring-opened copolymer composition (B-1). This toluene solution was poured into a large excess of isopropanol containing 2,6-di-t-butyl-p-cresol (BHT) to

TABLE 1

| | Ring-opened copolymer composition | | | Cross-linked rubber | | | |
|---|---|---|---|---|---|---|---|
| | | | | | Before heat aging | | After heat aging (120° C., 72 hour) |
| | Composition of ring-opened copolymer (weight ratio) | Content of norbornene compound (ppm by weight) | Increase rate of insoluble fraction (% by weight) | Rubber composition Mooney viscosity (index) | Tensile strength (index) | Elongation (index) | Change rate of tensile strength (%) | Change rate of elongation (%) |
| Example 1 | NB/CPE = 72/28 | 140 | 2 | 101 | 111 | 108 | 85 | 65 |
| Example 2 | NB/CPE = 72/28 | 85 | 1 | 102 | 110 | 112 | 92 | 70 |
| Comparative Example 1 | NB/CPE = 72/28 | 1,500 | 6 | 100 | 100 | 100 | 75 | 55 |
| Comparative Example 2 | NB/CPE = 72/28 | 0.8 | 1 | 108 | 101 | 99 | 83 | 63 |

In Table, "NB" is 2-norbornene, "CPE" is cyclopentene.

Comparative Example 3

Under a nitrogen atmosphere, 163 parts of 1,4-methano-1,4,4a,9a-tetrahydro-9H-fluorene (MITHF) as a norbornene compound represented by the above general formula (1), 541 parts of cyclopentene as a monocyclic olefin, 2800 parts of toluene, and 0.61 parts of 1-hexene were placed in a glass reactor with a stirrer. Subsequently, a polymerization catalyst solution in which 0.074 parts of (1,3-dimesitylimidazolidine-2-ylidene) (tricyclohexylphosphine)benzylidene ruthenium dichloride was dissolved in 30 parts of toluene was added thereto to cause the polymerization reaction to proceed at 25° C. for 4 hours. After the polymerization reaction, an excess of vinyl ethyl ether was added to terminate the polymerization reaction. The obtained polymer solution was poured into a large excess of isopropanol containing 2,6-di-t-butyl-p-cresol (BHT), and the precipitated polymer was collected and washed with isopropanol, and was then vacuum dried at 40° C. for 3 days to afford 320 parts of a ring-opened copolymer composition (B-1). The number average molecular weight (Mn) of the ring-opened copolymer in the obtained ring-opened copolymer composition (B-1) was 98,000, the weight average molecular weight (Mw) was 201,000, MITHF structural unit/cyclopentene structural unit ratio was 49/51 (on a weight ratio), the cis/trans ratio was 24/76, and the glass transition temperature (Tg) was −20° C. In addition, in the obtained ring-opened copolymer composition (B-1), the content of the 1,4-methano-1,4,4a,9a-tetrahydro-9H-fluorene (MTIHF) with respect to 100% by weight of the ring-opened copolymer was 3,200 ppm by weight. Then, using the obtained recover the precipitated polymer composition. Then, the recovered polymer composition was washed with isopropanol and then dried in vacuo at 60° C. for 5 days to obtain 158 parts of the ring-opened copolymer composition (B-2). The number average molecular weight (Mn) of the ring-opened copolymer in the obtained ring-opened copolymer composition (B-2) was 99,000, the weight average molecular weight (Mw) was 204,000, MTIHF structural unit/cyclopentene structural unit ratio was 49/51 (on a weight ratio), the cis/trans ratio was 24/76, and the glass transition temperature (Tg) was −21° C. In addition, in the obtained ring-opened copolymer composition (B-2), the content of the 1,4-methano-1,4,4a,9a-tetrahydro-9H-fluorene (MTHF) with respect to 100% by weight of the ring-opened copolymer was 340 ppm by weight. Then, using the obtained ring-opened copolymer composition (B-2), a heat aging test (increase rate of insoluble fraction) was performed. The results are shown in Table 2.

<<Preparation of Cross-Linkable Rubber Composition>>

Using the ring-opened copolymer composition (B-2) obtained in Example 3 and the ring-opened copolymer composition (B-1) obtained in Comparative Example 3, a rubber composition and a cross-linkable rubber composition were prepared in the same manner as in Example 1, and evaluation was similarly performed. The results are shown in Table 2.

TABLE 2

| | Ring-opened copolymer composition | | | Cross-linked rubber | | | | |
| | Composition of ring-opened copolymer (weight ratio) | Content of norbornene compound (ppm by weight) | Increase rate of insoluble fraction (% by weight) | Rubber composition Mooney viscosity (index) | Before heat aging | | After heat aging (120° C., 72 hour) | |
| | | | | | Tensile strength (index) | Elongation (index) | Change rate of tensile strength (%) | Change rate of elongation (%) |
|---|---|---|---|---|---|---|---|---|
| Example 3 | MTHF/CPE = 49/51 | 340 | 3 | 103 | 115 | 112 | 80 | 61 |
| Comparative Example 3 | MTHF/CPE = 49/51 | 3,200 | 9 | 100 | 100 | 100 | 70 | 52 |

In Table, "MTHF" is 1,4-methano-1,4,4a,9a-tetrahydro-9H-fluorene, "CPE" is cyclopentene.

Comparative Example 4

Polymerization was carried out in the same manner as in Comparative Example 3, except that 72 parts of dicyclopentadiene (DCPD) were used instead of 163 parts of 1,4-methano-1,4,4a, 9a-tetrahydro-9H-fluorene (MTHF), the used amount of cyclopentene was changed to 188 parts, the used amount of toluene was changed to 1160 parts, the used amount of (1,3-dimethylimidazolidine-2-ylidene) (tricyclohexylphosphine)benzylidene ruthenium dichloride was changed to 0.028 parts, and the used amount of 1-hexene was changed to 0.17 parts, respectively, to obtain a polymer solution, and recovery operation was carried out in the same manner as in Comparative Example 3 to obtain 217 parts of ring-opened copolymer compositions (C-1). The number average molecular weight (Mn) of the ring-opened copolymer in the obtained ring-opened copolymer composition (C-1) was 120,000, the weight average molecular weight (Mw) was 248,000, DCPD structural unit/cyclopentene structural unit ratio was 36/64 (on a weight ratio), the cis/trans ratio was 23/77, and the glass transition temperature (Tg) was −45° C. In addition, in the obtained ring-opened copolymer composition (C-1), the content of dicyclopentadiene (DCPD) with respect to 100% by weight of the ring-opened copolymer was 2,200 ppm by weight. Then, using the obtained ring-opened copolymer composition (C-1), a heat aging test (increase rate of insoluble fraction) was performed. The results are shown in Table 3.

Example 4

A part of the ring-opened copolymer composition (C-1) obtained in Comparative Example 4 described above was used, and a purification operation was performed. Specifically, 108 parts of the ring-opened copolymer composition (C-1) was dissolved in 1,000 parts of toluene to obtain a toluene solution of the ring-opened copolymer composition (C-1). This toluene solution was poured into a large excess of isopropanol containing 2,6-di-t-butyl-p-cresol (BHT) to recover the precipitated polymer composition. Then, the recovered polymer composition was washed with isopropanol and then dried in vacuo at 60° C. for 5 days to obtain 107 parts of the ring-opened copolymer composition (C-2). The number average molecular weight (Mn) of the ring-opened copolymer in the obtained ring-opened copolymer composition (C-2) was 122,000, the weight average molecular weight (Mw) was 249,000, DCPD structural unit/cyclopentene structural unit ratio was 36/64 (on a weight ratio), the cis/trans ratio was 23/77, and the glass transition temperature (Tg) was −45° C. In addition, in the obtained ring-opened copolymer composition (C-2), the content of dicyclopentadiene (DCPD) with respect to 100% by weight of the ring-opened copolymer was 210 ppm by weight. Then, using the obtained ring-opened copolymer composition (C-2), a heat aging test (increase rate of insoluble fraction) was performed. The results are shown in Table 3.

<<Preparation of Cross-Linkable Rubber Composition>>

Using the ring-opened copolymer composition (C-2) obtained in Example 4 and the ring-opened copolymer composition (C-1) obtained in Comparative Example 4, a rubber composition and a cross-linkable rubber composition were prepared in the same manner as in Example 1, and evaluation was similarly performed. The results are shown in Table 3.

TABLE 3

| | Ring-opened copolymer composition | | | Cross-linked rubber | | | | |
| | Composition of ring-opened copolymer (weight ratio) | Content of norbornene compound (ppm by weight) | Increase rate of insoluble fraction (% by weight) | Rubber composition Mooney viscosity (index) | Before heat aging | | After heat aging (120° C., 72 hour) | |
| | | | | | Tensile strength (index) | Elongation (index) | Change rate of tensile strength (%) | Change rate of elongation (%) |
|---|---|---|---|---|---|---|---|---|
| Example 4 | DCPD/CPE = 36/64 | 210 | 3 | 102 | 112 | 115 | 79 | 58 |
| Comparative Example 4 | DCPD/CPE = 36/64 | 2,200 | 11 | 100 | 100 | 100 | 66 | 51 |

In Table, "DCPD" is dicyclopentadiene, "CPE" is cyclopentene.

Comparative Example 5

Polymerization was carried out in the same manner as in Comparative Example 4, except that 90 parts of tetracyclo[6.2.1.1$^{3,6}$.0$^{2,7}$]dodec-4-ene (TCD) were used instead of 72 parts of dicyclopentadiene (DCPD), and the used amount of cyclopentene was changed to 170 parts, respectively, to obtain a polymer solution, and a recovery operation was similarly performed to obtain 208 parts of a ring-opened copolymer composition (D-1). The number average molecular weight (Mn) of the ring-opened copolymer in the obtained ring-opened copolymer composition (D-1) was 119,000, the weight average molecular weight (Mw) was 220,000, the TCD structural unit/cyclopentene structural unit ratio was 39/61 (on a weight ratio), the cis/trans ratio was 34/66, and the glass transition temperature (Tg) was −25° C. In addition, in the obtained ring-opened copolymer composition (D-1), the content of tetracyclo[6.2.1.1$^{3,6}$.0$^{2,7}$]dodec-4-ene (TCD) with respect to 100% by weight of the ring-opened copolymer was 1,800 ppm by weight. Then, using the obtained ring-opened copolymer composition (D-1), a heat aging test (increase rate of insoluble fraction) was performed. The results are shown in Table 4.

Example 5

A part of the ring-opened copolymer composition (D-1) obtained in Comparative Example 5 described above was used, and a purification operation was performed. Specifically, 104 parts of the ring-opened copolymer composition (D-1) was dissolved in 1,000 parts of toluene to obtain a toluene solution of the ring-opened copolymer composition (D-1). This toluene solution was poured into a large excess of isopropanol containing 2,6-di-t-butyl-p-cresol (BHT) to recover the precipitated polymer composition. The recovered polymer composition was then washed with isopropanol and then dried in vacuo at 60° C. for 5 days to obtain 102 parts of the ring-opened copolymer composition (D-2). The number average molecular weight (Mn) of the ring-opened copolymer in the obtained ring-opened copolymer composition (D-2) was 123,000, the weight average molecular weight (Mw) was 234,000, the TCD structural unit/cyclopentene structural unit ratio was 39/61 (on a weight ratio), the cis/trans ratio was 35/65, and the glass transition temperature (Tg) was −25° C. In addition, in the obtained ring-opened copolymer composition (D-2), the content of tetracyclo[6.2.1.1$^{3,6}$.0$^{2,7}$]dodec-4-ene (TCD) with respect to 100% by weight of the ring-opened copolymer was 240 ppm by weight. Then, using the obtained ring-opened copolymer composition (D-2), a heat aging test (increase rate of insoluble fraction) was performed. The results are shown in Table 4.

<<Preparation of Cross-Linkable Rubber Composition>>

Using the ring-opened copolymer composition (D-2) obtained in Example 5 and the ring-opened copolymer composition (D-1) obtained in Comparative Example 5, a rubber composition and a cross-linkable rubber composition were prepared in the same manner as in Example 1, and evaluation was similarly performed. The results are shown in Table 4.

TABLE 4

| | Ring-opened copolymer composition | | | Cross-linked rubber | | | | |
| | | | | | | | After heat aging | |
| | | | | Rubber | | | (120° C., 72 hour) | |
| | Composition of ring-opened copolymer (weight ratio) | Content of norbornene compound (ppm by weight) | Increase rate of insoluble fraction (% by weight) | composition Mooney viscosity (index) | Before heat aging | | Change rate | Change |
| | | | | | Tensile strength (index) | Elongation (index) | of tensile strength (%) | rate of elongation (%) |
| --- | --- | --- | --- | --- | --- | --- | --- | --- |
| Example 5 | TCD/CPE = 39/61 | 240 | 1 | 101 | 108 | 105 | 95 | 90 |
| Comparative Example 5 | TCD/CPE = 39/61 | 1,800 | 3 | 100 | 100 | 100 | 85 | 75 |

In Table, "TCD" is tetracyclo[6.2.1.1$^{3,6}$.0$^{2,7}$]dodec-4-ene, "CPE" is cyclopentene.

From Tables 1 to 4, when, in a ring-opened copolymer containing a structural unit derived from a norbornene compound represented by the above general formula (1) and a structural unit derived from a monocyclic cyclic olefin, the content of a norbornene compound represented by the above general formula (1) with respect to 100% by weight of such a ring-opened copolymer was set to 1 ppm by weight or more and 1,000 ppm by weight or less, the composition containing such the ring-opened copolymer could be made to have good processability and excellent heat aging resistance, and a cross-linked rubber obtained by using a composition containing such a ring-opened copolymer was excellent in tensile strength, elongation properties, and aging resistance (Examples 1 to 5).

On the other hand, when the content of the norbornene compound represented by the above general formula (1) was more than 1000 ppm by weight, the tensile strength and elongation characteristics when made into a cross-linked rubber were low, and also the heat aging resistance was inferior (Comparative Example 1, 3, 4 and 5).

Further, when the content of the norbornene compound represented by the above general formula (1) was 1 ppm by weight, it became inferior in processability, and further, it resulted in low tensile strength and elongation characteristics when made into a cross-linked rubber (Comparative Example 2).

The invention claimed is:
1. A ring-opened copolymer composition comprising a ring-opened copolymer containing structural unit derived from a norbornene compound represented by general formula (1) below and structural unit derived from a monocyclic olefin, wherein
   a content of a norbornene compound represented by general formula (1) is 1 ppm by weight or more and 1000 ppm by weight or less based on the ring-opened copolymer,

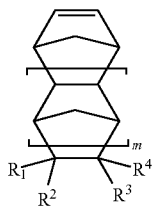

(1)

wherein $R^1$ to $R^4$ are each a hydrogen atom, a hydrocarbon group having 1 to 20 carbon atoms, or a substituent containing a halogen atom, a silicon atom, an oxygen atom or a nitrogen atom, and $R^2$ and $R^3$ may be bonded to each other to form a ring, and "m" is 0 or 1.

2. The ring-opened copolymer composition according to claim 1, wherein the cis/trans ratio of the ring-opened copolymer is from 0/100 to 80/20.

3. The ring-opened copolymer composition according to claim 1, wherein the glass transition temperature of the ring-opened copolymer is −80 to 10° C.

4. The ring-opened copolymer composition according to claim 1, wherein a content ratio of the structural unit derived from the norbornene compound represented by the general formula (1) to the total repeating structural units in the ring-opened copolymer is 20 to 80% by weight.

5. The ring-opened copolymer composition according to claim 1, wherein a content ratio of the structural unit derived from monocyclic olefin to the total repeating structural units in the ring-opened copolymer is 20 to 80% by weight.

6. The ring-opened copolymer composition according to claim 1, wherein the norbornene compound represented by general formula (1) is bicyclo[2.2.1]hept-2-enes having no substituents or having a hydrocarbon substituent or tetracyclo[6.2.1.1$^{3,6}$.0$^{2,7}$]dodec-4-enes having no substituents or having a hydrocarbon substituent.

7. The ring-opened copolymer composition according to claim 1, wherein the monocyclic olefin is a cyclic monoolefin.

8. The ring-opened copolymer composition according to claim 1, wherein the cyclic monoolefin is at least one selected from cyclopentene, cyclohexene, cycloheptene and cyclooctene.

9. The ring-opened copolymer composition according to claim 1, wherein the ring-opened copolymer is substantially consisting of the structural unit derived from the norbornene compound represented by the general formula (1) and the structural unit derived from the monocyclic olefin.

10. A rubber composition comprising the ring-opened copolymer composition according to claim 1.

11. The rubber composition according to claim 10, further comprising a cross-linking agent.

12. A cross-linked rubber obtained by cross-linking the rubber composition according to claim 10.

* * * * *